Patented June 3, 1930

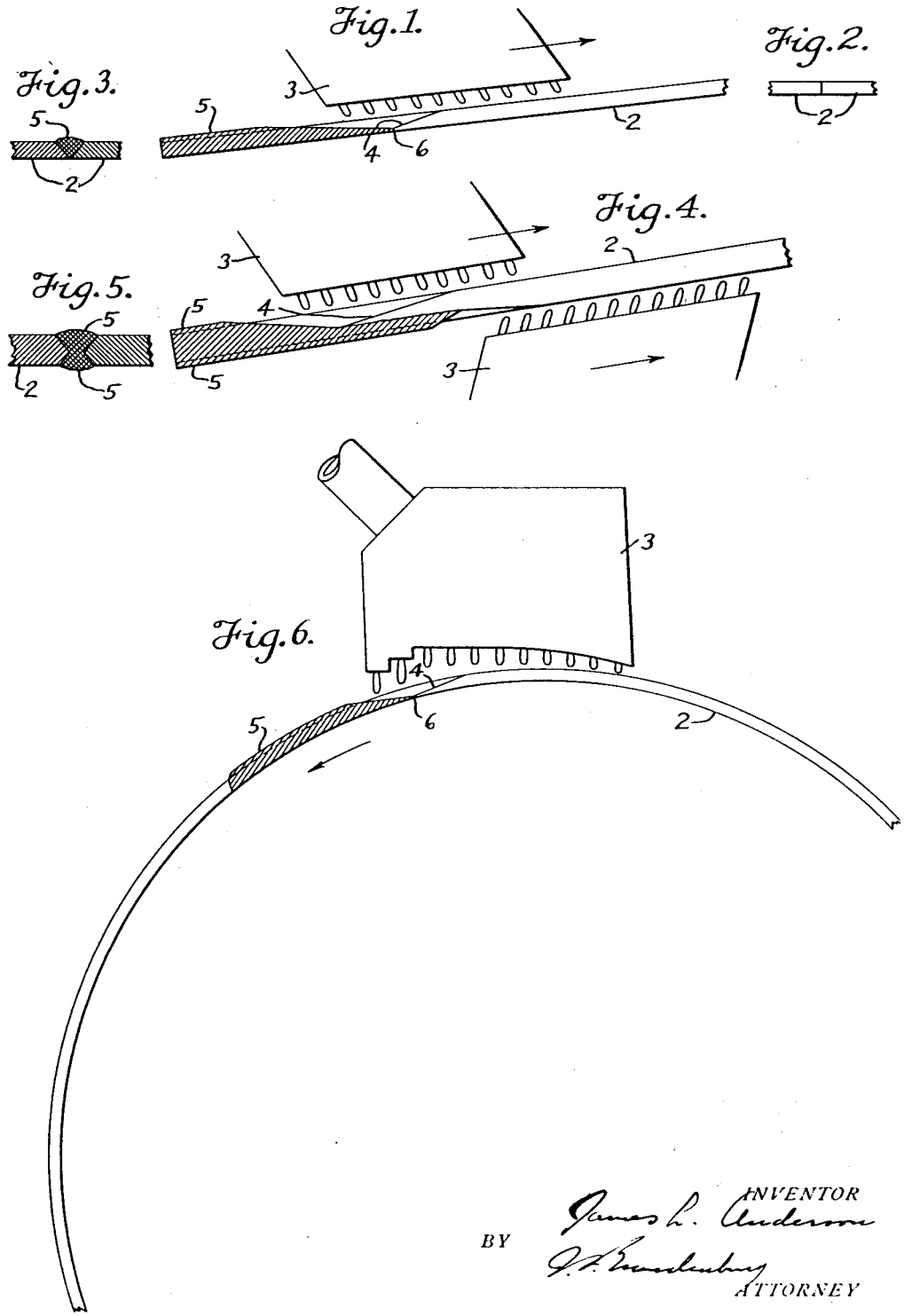

1,761,167

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

METHOD OF WELDING

Application filed January 13, 1928. Serial No. 246,451.

The invention relates to the production of fusion welds by the oxyacetylene or like flame between the abutting edges of sheet steel material, and the object is to secure fuller and therefore better and stronger welds, and also to secure better penetration and to make possible higher welding speeds. By the method herein described, reinforced or beaded welds, higher than the surface of the sheets, can be readily obtained, without the addition of metal and without compression.

In welding of this kind the condition of the edges to be united affects the thickness of the welds. The conditions that may be present, and part at least of which usually exist in greater or less degree, include irregularities in the straightness of the edges, roughness, angularity of the edges, and compression of the edges. Lack of straightness causes the edges to be more or less separated at certain regions, and roughness of the edges, even though otherwise accurately sheared, prevents the edges from coming into close abutment.

By angularity of the edges is meant the angle of the face of the edge with reference to the surface of the sheet. As the thickness of plates increases the sheared edge tends to assume a decided angle from the vertical, due to the condition of the knives and flexibility of the sheer. Two edges sheared perfectly straight but placed in position for welding without reference to the angularity of the edge faces may give a condition in which the edges are in abutment at the bottom and apart several thousandths of an inch at the top, or vice-versa.

Compression of the edge of the sheets both on top and bottom results from the pressure applied by the shear blades, causing a thinning of the material.

Any or all of these and like conditions, in oxyacetylene welding as heretofore practised, tend to, and commonly do, produce comparatively thin welds, because of the inability to spread the weld over an area sufficiently great to make up a deficiency of metal due to thinness or separation of the edges. The drawback affects so-called mechanical welding by the oxyacetylene process, that is to say operations in which the torch is supported by a suitable bracket or holder so that its jets are always in fixed proximity to the work and are driven at uniform speed in a single direction lengthwise of the seam. "Mechanical" torch welding is, of course, not mechanical in any real sense, the extent of the mechanical feature being the stability of support, and the steadiness and single direction of the movement of the torch relative to the work, or of the work relative to a stationary torch. The success of these operations in respect to welding speeds sufficiently high to be economical and also in respect to the depth of penetration of the weld, depends upon the use of a torch, tip, or a plurality of torches, tips or burners, delivering a line or lines of fine flames or jets acting to introduce successive increments of heat to bring the metal gradually to fusion with complete penetration. The operation produces a narrow elongated puddle of metal, which is derived from the abutting edge portions themselves and which is controlled and kept in place by its own surface tension. Such welding is quite different from the making of the manipulated and built-up welds characteristic of hand welding.

The jet or jets beneath which the fusion occurs and penetrates downward to or near the bottom of the work are referred to as the welding jets, while the jets of the flame in advance are the preheating jets. Similar functions are ascribable to the portions of true linear flames delivered from slit orifices, but these are not very practical.

With this understanding, it may be said that the invention applies more particularly to welding operations of the kind indicated. In some cases of mechanical torch welding thinness of the weld has been overcome by compression exerted transversely of the seam, either by the application of external force or resulting from the expansion of the metal by heat while the parts to be united are clamped. By sufficient pressure an upsetting of the weld can be obtained. It is one of the advantages of the present invention that compression is not required, but it is not necessarily excluded, as it may be utilized in some degree for added effect. Deficiency of metal in the weld is also sometimes compensated for by melting metal from a rod or wire at the welding region. This involves extra complication, which is unnecessary with my invention, though again it might also be employed to obtain even greater thickness in some instances.

The novel feature of the invention is that the welding flame or welding flames at least of the series of flames or jets (or the rear portion at least of a continuous line flame) is caused to act upon a surface which continually slopes downward toward the congealed weld. This permits the molten metal to flow rearwardly (that is to say, toward the completed part of the weld and away from the unwelded portion of the seam), so that a new unmelted surface is continually presented to the welding flames, which surface is at a decided angle to the surface of the sheets. The heated metal on this surface flows in a thin film downward to the congealing point. The flow of molten metal removes it from the unmelted metal, so that the latter is more readily attacked by the jets, and causes it to accumulate at the congealing point, with the result that the weld is thicker or fuller than it would otherwise be. If the weld would otherwise be considerably thinner than the body of the sheet material, the result may still be a weld somewhat below the general surface, but in any event materially higher than it would be without the application of the invention. The result which is to be desired, and which is easily secured by the improvement, is a weld at least as full as the thickness of the sheets, and better still, for most purposes, a weld which is raised above the surface by reason of piling up of the metal. The fullness or contour of the weld is governed by the angle of the incline.

Another important advantage is that, because the metal is compelled to flow from a point where it is melted to a point where it solidifies, more rapid heating and melting can occur and consequently the flames, or the work, can be displaced in the direction of the length of the seam at greater speed, and, therefore, more economical welding can be accomplished. The prompt removal of the metal as fast as it is melted, exposing the unmelted region beneath, is also a decided factor for insuring the much desired complete penetration of the weld. Thus, the advantages are thicker, or reinforced, welds, better or more certain penetration, greater strength due to these things, and greater speed and economy.

In the accompanying drawings forming part hereof:

Fig. 1 is a somewhat schematic sectional view taken in the plane of the seam illustrating welding performed at one side of the work in accordance with the invention;

Fig. 2 is a cross-section through the unwelded seam;

Fig. 3 is a cross-section through the weld;

Fig. 4 is a view similar to Fig. 1 showing the application of the invention to welding at both sides simultaneously;

Fig. 5 is a cross-section through the weld produced in Fig. 4; and

Fig. 6 is a schematic view illustrating circumferential welding in accordance with the invention.

Figs. 1 to 3 may be understood as representing the welding of a longitudinal seam between two abutting sheets or plates 2. In such cases the work is usually stationary and the flames are moved. The flames are represented as being delivered from a multiple jet torch tip 3, and the arrow indicates the direction in which the torch is moved. It is unnecessary to illustrate the torch more fully, or means for supporting it and for moving it, at uniform speed in a single direction, as these matters are conventional.

The significant feature or step is that the welding flames are caused, as stated, to operate on a seam or surface which continually slopes downward toward the congealed or completed weld. In cases such as illustrated in Figs. 1 to 3 this involves supporting the work at an inclination which slopes downward and rearward. It also involves tilting the torch tip, or the series of exits from which the flames are delivered, in a corresponding manner. It is not necessary to illustrate a support for the work, as it may be of any character.

The downward slope is in a rearward direction, opposite to the direction of movement of the torch, which is caused to proceed uphill. The reverse may be practised, that is to say, with the torch stationary and the work caused to move at the same inclination in the direction opposite to that indicated by the arrow. In either case, the slope of the surface is downward and rearward, in the sense that downhill is away from the unwelded part of the seam and toward the welded part.

The steeply sloping breast of the region of fusion is indicated diagrammatically at 4. From this point, which is of course constantly progressing along the seam as the flames and the work are moved in relation to each other, the molten metal flows freely away from the unmelted metal, divides to pass around the succeeding jets, and accumulates in the rear of the last welding jet, where it solidifies. Figs. 1 and 3 show that the metal in the weld 5 has piled up above the surface of the sheets. At the point 6 complete penetration is obtained.

As indicated in the drawing, the melting of the metal by the heat supplied by the jets, and the flow of this metal rearwardly under control of surface tension and gravity, produces a cavity which progresses along the seam, continually and rapidly exposing the still solid metal to the fusing heat. The transfer of the molten metal from the region of melting to the region of solidification is regulated by the degree of inclination constantly maintained, thereby securing a weld of predetermined fullness or reinforcement.

The jets from the region 4 rearward may be considered the welding jets, while the jets forward from 4 may be considered the preheating jets. The flame jets may all be of the same composition, or part of the preheating jets may be composed of a mixture giving flames of lower intensity. The flames may all be delivered from a single tip or burner, or a number of burners may be used in line, all of these things being known.

Fig. 3 represents welding in accordance with the same plan, utilizing preheating and welding flames at both sides of the work, each agency producing a part of the total penetration.

Operations such as are illustrated in these views are not confined to flat sheets or plates. The work may be sheet material curved into cylindrical form, or even bent into an angular tubular form, with its edges in abutting relation.

In any of these cases, the metal which is melted at one point and removed a considerable distance to congeal at another point, may have to be replaced at the finishing end of the weld by some additional operation. This need not be required, however, if full strength at this region is not required, or if manufacturing operations are such that this part can be cut off. The amount of the weld at the finishing end which would not be of full strength will be dependent upon the distance the molten metal is moved along the work and this in turn upon the angle or slope at which the welding is performed. These matters may therefore be regulated according to what is desired.

Fig. 6 represents circumferential welding, practised, for example, when two tubes, hollow cylinders or lengths of pipe are to be united end to end. In such cases, the parts of the work are rotated together about a horizontal or generally horizontal axis, while the torch is kept stationary. The arrow, therefore, represents the direction of movement or rotation of the work. In such an operation, part of the preheating jets may be directly over the top of the circle, or over the upward slope leading to the top in the direction of rotation. The welding jets, however, are always kept over the downgoing slope, so that the result heretofore described is obtained.

A carrying out of the invention such as illustrated in Fig. 6 is also applicable to spiral welding, wherein a sheet or strip of metal is laid up spirally into tubular form and the abutting spiral edges are simultaneously welded, this being a known method. The difference, in such a case, would be that the tips would be skewed to correspond to the direction of the spiral seam.

When welding circumferentially with the invention, welds of full thickness can be made in which there is no evidence of a starting or finishing point, by causing the work to overrun a complete circle sufficiently to smooth out any irregularity that would otherwise exist.

I claim:

The method of autogenously welding a seam involving the opposed edges of sheet metal parts, which comprises bringing to fusion and fusing the edges by means of a series of preheating and welding flames while the work and the flames are relatively moved at fixed distance in one direction at uniform speed, causing the welding flame or flames to act upon a surface which continually slopes downward toward the congealed weld, thereby progressively producing a cavity the molten metal from which is transferred rearwardly under control of surface tension and the force of gravity, and governing the contour of the weld by the degree of inclination of the slope at the region where the metal of the edges is thoroughly fused.

JAMES L. ANDERSON.